(12) United States Patent
Lee et al.

(10) Patent No.: US 11,057,945 B2
(45) Date of Patent: Jul. 6, 2021

(54) APPARATUS AND METHOD FOR RANDOM ACCESS IN WIRELESS COMMUNICATION SYSTEM

(71) Applicant: INDUSTRY-ACADEMIC COOPERATION FOUNDATION, YONSEI UNIVERSITY, Seoul (KR)

(72) Inventors: Jang Won Lee, Seoul (KR); Byung Hyun Lee, Seoul (KR); Seok Jae Moon, Seoul (KR); Hyun Suk Lee, Seongnam-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/565,812

(22) Filed: Sep. 10, 2019

(65) Prior Publication Data

US 2020/0137807 A1    Apr. 30, 2020

(30) Foreign Application Priority Data

Oct. 24, 2018 (KR) .................. 10-2018-0127581

(51) Int. Cl.
*H04W 74/00* (2009.01)
*H04W 74/08* (2009.01)
*H04W 76/11* (2018.01)
*H04W 56/00* (2009.01)

(52) U.S. Cl.
CPC ... *H04W 74/0858* (2013.01); *H04W 56/0045* (2013.01); *H04W 74/0891* (2013.01); *H04W 76/11* (2018.02)

(58) Field of Classification Search
CPC . H04W 72/1215; H04W 76/30; H04W 64/00; H04W 72/1268; H04W 76/10; H04W 88/06; H04W 76/12; H04W 76/19; H04W 76/32

See application file for complete search history.

(56) References Cited

U.S. PATENT DOCUMENTS

| | | | |
|---|---|---|---|
| 9,661,663 B1* | 5/2017 | Lin | ................... H04W 74/006 |
| 2012/0236803 A1* | 9/2012 | Vujcic | ................... H04L 5/003 370/329 |
| 2017/0150523 A1* | 5/2017 | Patel | ................... H04W 48/10 |
| 2017/0324587 A1* | 11/2017 | Lin | ................... H04L 27/2675 |

(Continued)

FOREIGN PATENT DOCUMENTS

| | | |
|---|---|---|
| KR | 10-0949972 B1 | 3/2010 |
| KR | 10-2010-0089262 A | 8/2010 |

(Continued)

*Primary Examiner* — Lakeram Jangbahadur

(57) ABSTRACT

The present disclosure provides an apparatus and a method for random access in a wireless communication system having a base station and wireless terminals, where the wireless terminal can select a detection sub-segment from a preamble detection segment that is divided into a multiple number of detection sub-segments, transmit a random access preamble with the timing adjusted such that the random access preamble is received at the base station in the selected detection sub-segment, and when a random access response message is received from the base station, transmit a terminal identification message to the base station and receive a contention resolution message from the base station.

4 Claims, 9 Drawing Sheets

(56) References Cited

U.S. PATENT DOCUMENTS

2017/0331577 A1* 11/2017 Parkvall ............... H04J 11/0079
2019/0132882 A1* 5/2019 Li ..................... H04W 74/0833
2020/0100299 A1* 3/2020 Loehr .................. H04W 76/11

FOREIGN PATENT DOCUMENTS

KR  10-2013-0084955 A   7/2013
KR  10-2016-0134274 A   11/2016

* cited by examiner

APPARATUS AND METHOD FOR RANDOM ACCESS IN WIRELESS COMMUNICATION SYSTEM

CROSS-REFERENCE TO RELATED APPLICATIONS

This application claims priority under 35 U.S.C. 119(a) to Korean Patent Application No. 10-2018-0127581, filed with the Korean Intellectual Property Office on Oct. 24, 2018, the disclosure of which is incorporated herein by reference in its entirety.

BACKGROUND

1. Technical Field

The present disclosure relates to an apparatus and a method for random access in a wireless communication system, more particularly to an apparatus and a method for random access in a wireless communication system that can reduce collisions in an environment where multiple wireless terminals in a cell attempt massive connectivity.

2. Description of the Related Art

In an existing wireless communication system, wireless terminals generally perform a random access process, which is a method for contention-based connectivity.

A contention-based connection system refers to a system in which multiple users compete for and share resources from among a fixed amount of resources. In a contention-based connection system, a terminal may randomly choose and transmit resources, such as a particular sequence or code, and this may result in a collision when several wireless terminals use the same resources.

In the technology for the current LTE/LTE-A standard, each wireless terminal may attempt a random access process to create an RRC (radio resource control) connection to a base station, and in such a random access process, the wireless terminal makes a transmission through a physical random access channel (hereinafter referred to as PRACH), which is a physical channel for random access, after arbitrarily selecting one of the designated number (e.g. sixty four) of preambles. Here, when several wireless terminals simultaneously select the same preamble for the transmissions, a preamble collision occurs in the PRACH. When a preamble collision occurs, the wireless terminals may have to perform a back-off and make retransmissions, and severe cases of collisions can cause increased delay times and lowered efficiency in the usage of radio resources.

Also, in the event of a preamble collision, if the base station does not detect the collision, the base station may transmit a random access response (RAR) message to all of the wireless terminals that have sent the corresponding preamble. The multiple wireless terminals that receive a RAR message then send connection request messages to the base station, thereby resulting in another collision. The repeated occurrences of such collisions may incur an increase in the delay time for the terminals as well as decreased usage efficiency for the radio resources of the PRACH.

Also, large-scale IoT(Internet of Things) communication technology, a major field of research in 5G communications technology, refers to the communications technology for circumstances in which IoT terminals are present in a large scale within a cell. As preamble collisions can occur even more frequently in the presence of large-scale IoT terminals, there is a need for alleviating such collisions.

SUMMARY

An objective of the present disclosure is to provide a random access apparatus and method for a wireless communication system that enable an efficient use of radio resources in an environment having IoT terminals arranged in a large scale.

Another objective of the present disclosure is to provide a random access apparatus and method for a wireless communication system that can reduce preamble collisions by using fixed timing advances (TA) for IoT terminals to adjust the preamble transmission timing and thereby providing an effect tantamount to increasing the preamble resources.

To achieve the objectives above, an embodiment of the present disclosure provides a wireless for a wireless communication system, where the wireless terminal selects a detection sub-segment from a preamble detection segment that is divided into a multiple number of detection sub-segments, transmits a random access preamble with the timing adjusted such that the random access preamble is received at a base station in the selected detection sub-segment, and when a random access response message is received from the base station, transmits a terminal identification message to the base station and receives a contention resolution message from the base station.

The wireless terminal can have a TA (timing advance) stored beforehand, which may have been acquired during a previous communication with the base station, and can transmit the random access preamble by adjusting the timing such that the random access preamble is received at the base station in the selected detection sub-segment according to the stored TA.

Before selecting the detection sub-segment, the wireless terminal can receive SIB2 (system information block 2) information, which may pertain to random-access-related system information and may be broadcasted from the base station, and can determine the preamble detection segment and the multiple detection sub-segments of the base station according to detection sub-segment information included in the SIB2 information.

To achieve the objectives above, another embodiment of the present disclosure provides a base station for a wireless communication system, wherein the base station divides a preamble detection segment into a multiple number of detection sub-segments designated beforehand, detects a random access preamble received from at least one wireless terminal in units of the divided detection sub-segments, transmits a random access response message to the wireless terminal according to the detected random access preamble, and when a terminal identification message is received from the wireless terminal, transmits a contention resolution message to the wireless terminal.

The base station can assign different preamble identifiers (RAPID's) for identical random access preambles detected in different detection sub-segments of one preamble detection segment.

Before receiving the random access preamble, the base station can broadcast SIB2 (system information block 2) information, which may pertain to random-access-related system information and may include detection sub-segment information pertaining to information on the multiple detection sub-segments.

To achieve the objectives above, still another embodiment of the present disclosure provides a random access method for a wireless terminal in a wireless communication system, where the random access method includes: selecting a detection sub-segment from a preamble detection segment that is divided into a multiple number of detection sub-segments; transmitting a random access preamble with the timing adjusted such that the random access preamble is received at a base station in the selected detection sub-segment; receiving a random access response message from the base station; transmitting a terminal identification message to the base station; and receiving a contention resolution message from the base station.

To achieve the objectives above, yet another embodiment of the present disclosure provides a random access method for a base station in a wireless communication system, where the random access method includes: receiving a random access preamble from at least one wireless terminal; detecting the random access preamble in units of a multiple number of detection sub-segments of a preamble detection segment; transmitting a random access response message to the wireless terminal according to the detected random access preamble; receiving a terminal identification message from the wireless terminal; and transmitting a contention resolution message to the wireless terminal.

With the apparatus and method for random access in a wireless communication system based on an embodiment of the present disclosure, each of the wireless terminals in the wireless communication system having multiple wireless terminals may make transmissions with the preamble timing adjusted using a timing advance (TA) acquired previously, and the base station can detect the preambles in units of detection sub-segments, thereby providing an effect tantamount to increasing the limited number of preamble resources. Thus, preamble collisions can be reduced, the multiple wireless terminals can readily achieve successful random access, and the average connection delay time and the amount of power consumed for the wireless terminals can be reduced as well.

Additional aspects and advantages of the present disclosure will be set forth in part in the description which follows, and in part will be obvious from the description, or may be learned by practice of the present disclosure.

DETAILED DESCRIPTION OF THE INVENTION

Figure 1:
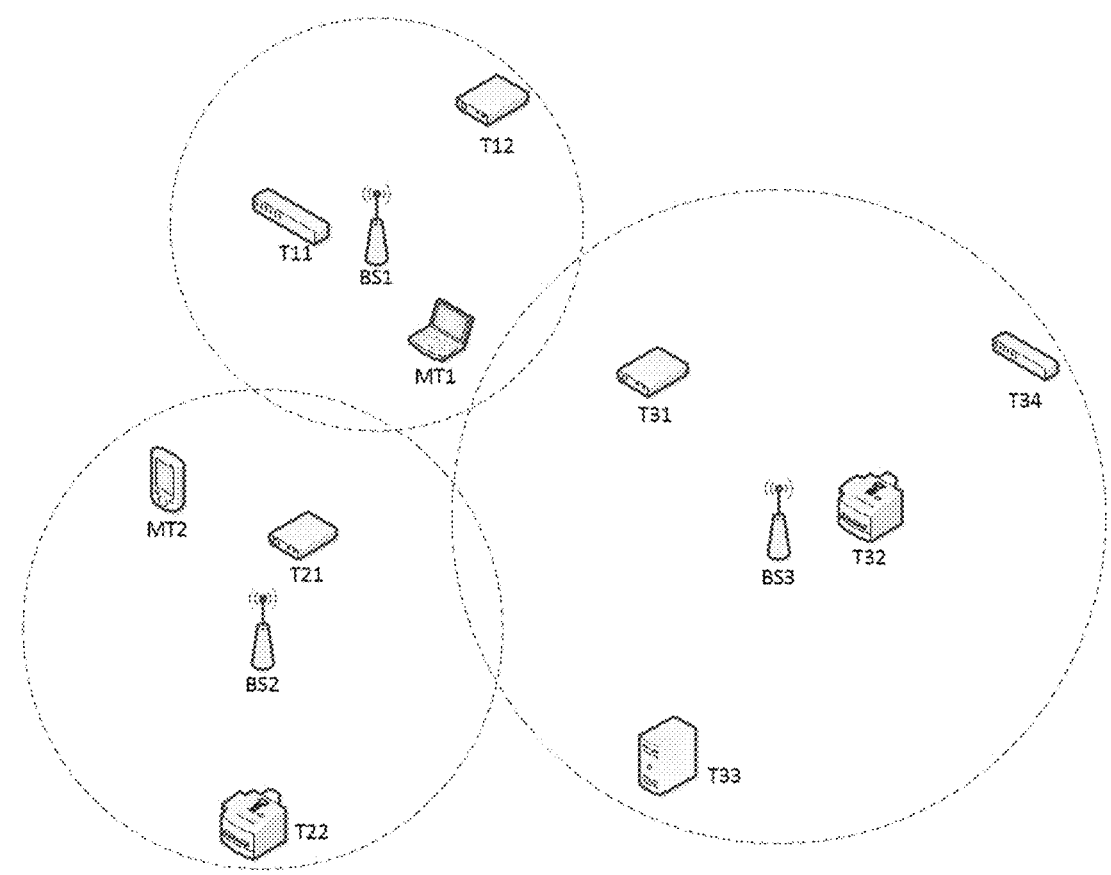
FIG. 1 conceptually illustrates the structure of a wireless communication system based on an embodiment of the present disclosure.

A sufficient understanding of the present disclosure, the advantages derived from the operation of the present disclosure, and the objectives achieved by the practicing of the present disclosure requires a referencing of the accompanying drawings, which illustrate a preferred embodiment of the present disclosure, as well as the descriptions disclosed in the drawings.

The present disclosure is described below in more detail based on an explanation of a preferred embodiment of the present disclosure. However, the present disclosure can be implemented in many different forms and is not limited to the embodiment described herein. Also, for a clear understanding of the present disclosure, parts that are not of great relevance to the explanation have been omitted. In the drawings, like reference numerals refer to like components.

Throughout the specification, when a part is referred to as "including" a certain element, this does not preclude the presence of other elements and can mean that other elements may further be included, unless there is specific mention to the contrary. Also, terms such as "part", "device", "module", "block", etc., refer to units for processing at least one function or operation, where such units can be implemented as hardware or software or a combination of hardware and software.

FIG. 1 conceptually illustrates the structure of a wireless communication system based on an embodiment of the present disclosure.

Referring to FIG. 1, the wireless communication system may include multiple base stations BS1~BS3, and each base station may form a corresponding cell area. As illustrated in FIG. 1, the cell areas of the multiple base stations BS1 BS3 can have different sizes.

In each cell area, there can be arranged multiple wireless terminals T11, T12, T21, T22, T31~T34. Here, the wireless terminals T11, T12, T21, T22, T31~T34 can be arranged in arbitrary locations of the cell area. That is, the distances between the wireless terminals T11, T12, T21, T22, T31~T34 and the corresponding base stations BS1~BS3 can be different from one another.

Here, it is assumed that the multiple wireless terminals T11, T12, T21, T22, T31~T34 are IoT terminals having fixed locations, such as for sensors, smart mirroring, smart factories, etc., and an embodiment of the present disclosure proposes a random access method for such fixed IoT terminals.

The multiple wireless terminals T11, T12, T21, T22, T31~T34 may perform a random access process, with the base stations BS1~BS3 of the cell areas to which they belong, to connect to the network.

Also, in each of the cell areas, there can be at least one mobile terminal MT1, MT2 arranged. The mobile terminals MT1, MT2 can change locations, and the wireless terminals T11, T12, T21, T22, T31~T34 can connect to the network by performing a random access process with the base stations BS1~BS3 of the cell areas to which they belong. When a mobile terminal MT1, MT2 moves to a different cell area, it can connect to the network by performing a random access process again with the new base station.

Figure 2:
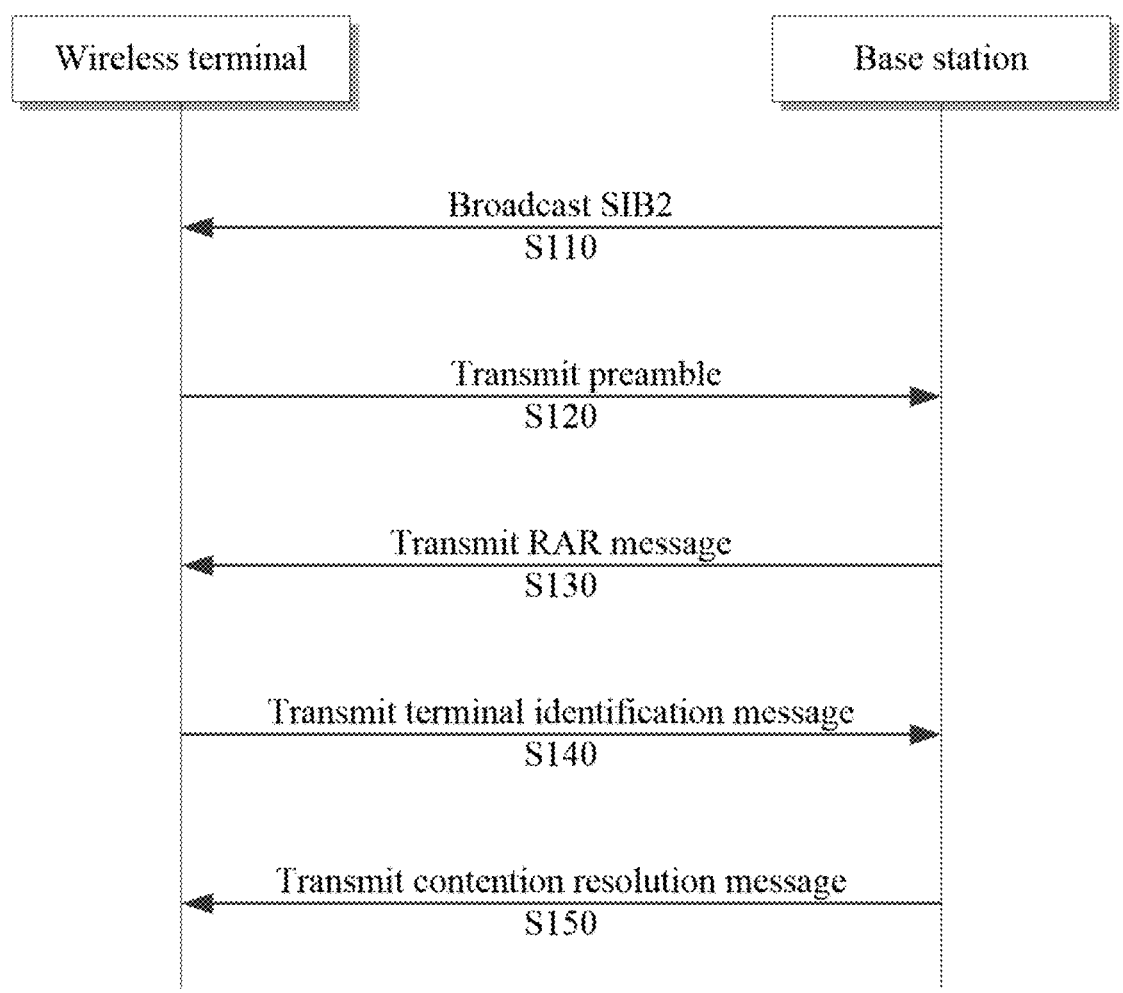
FIG. 2 illustrates a random access method in a wireless communication system based on an embodiment of the present disclosure.

FIG. 2 illustrates a random access method in a wireless communication system based on an embodiment of the present disclosure.

In the wireless communication system, a wireless terminal that wishes to connect to the network may acquire a C-RNTI (cell radio network temporary identifier), which is its identifier within the cell, from the base station BS1~BS3 through a RACH (random access channel) and may perform a random access process for connecting to the network.

The random access process may be divided into two types, a contention-based type and a contention-free type. In a contention-based type random access method, a wireless terminal randomly selects a random access preamble (or preamble) for transmission, so that if multiple wireless terminals transmit the same preamble simultaneously, a problem of preamble collision can arise, and the wireless terminals may have to reattempt the random access several times. In contrast, in the contention-free type, a wireless terminal can be assigned a preamble that is specific to the terminal and thus can transmit the preamble without collisions.

Most wireless terminals trying to connect to the network generally perform a contention-based random access process and use the contention-free type in exceptional cases, such as during a handover, when the random access must be performed quickly.

However, as this embodiment assumes that the multiple wireless terminals T11, T12, T21, T22, T31~T34 are IoT terminals having fixed locations, handovers would not occur. Thus, the multiple wireless terminals T11, T12, T21, T22, T31~T34 may perform random access using the contention-based method.

Referring to FIG. 2, the random access method for a wireless communication system may first have the base station BS1~BS3 broadcasting random-access-related system information (hereinafter referred to as system information block 2 or SIB2 information) to the wireless terminals T11, T12, T21, T22, T31~T34 and mobile terminals MT1, MT2 within the corresponding cell area (operation S110). Here, the SIB2 information may include parameter values associated with the RACH (for example, information on the physical random access channel (PRACH) configuration index, RAR window size, contention resolution timer, maximum number of retransmissions, preamble transmission power, etc.).

From among the multiple number of wireless terminals T11, T12, T21, T22, T31~T34 and mobile terminals MT1, MT2, a wireless terminal that wishes to connect to the network may use the SIB2 information thus received to perform the random access process which includes the following four steps.

The wireless terminal may receive the SIB2 information and, from among a pre-designated number (e.g. 64 in LTE/LTE-A) of preamble sequences, may check the set of preamble sequences that can be used for contention-based random access. Also, the wireless terminal may randomly select a preamble from among the usable contention-based random access preamble sequences, add a CP (cyclic prefix), and transmit it through the PRACH to the base station (operation S120).

Here, a wireless terminal based on this embodiment can use previously acquired TA (timing advance) information to arbitrarily adjust the timing by which the randomly selected preamble is transmitted through the PRACH. The TA is a timing adjustment value for the wireless terminals T11, T12, T21, T22, T31~T34 and mobile terminals MT1, MT2 performing uplink synchronization with the base station and represents the wave delay time, which may vary according to the distance from the base station. That is, in a wireless communication system based on this embodiment, the wireless terminal T11, T12, T21, T22, T31~T34 may have already acquired the TA based on previous communications with the base station and may adjust the timing of transmitting the preamble based on the stored TA.

The base station BS1~BS3 may detect the preambles transmitted by the wireless terminals in units of preamble detection segments, which are time segments for performing preamble detection, and if a preamble transmitted by a wireless terminal is detected, may transmit a RAR (random access response) message to the wireless terminal that sent the preamble (operation S130).

Here, a base station based on this embodiment can detect the preambles according not only to the conventional preamble detection segments but also according to detection sub-segments, into which each preamble segment is divided. That is, the base station can readily recognize the preamble transmitted by each wireless terminal according to not only the preamble randomly selected but also the detection sub-segment randomly selected at the wireless terminal. The base station can then transmit the RAR message to the wireless terminal according to the recognized preamble.

Here, the RAR message may be transmitted through a PDSCH (physical downlink shared channel) designated by a PDCCH (physical downlink control channel) using RA-RNTI's (random access radio network temporary identifiers). The RAR message can include information such as information on the detected preamble, information on the timing advance command for uplink synchronization, information on uplink resources for transmitting a terminal identification message, the TC-RNTI (temporary C-RNTI) assigned to the wireless terminal, the back-off indicator, and other information.

In an existing wireless communication system, the base station would receive the preamble transmitted from a wireless terminal or mobile terminal, calculate the TA based on the delay time of the received preamble, and transmit the TA to the wireless terminal T11, T12, T21, T22, T31~T34 or mobile terminal MT1, MT2 that sent the preamble.

Therefore, in the existing wireless communication system, the wireless terminals T11, T12, T21, T22, T31~T34 and mobile terminals MT1, MT2 would not be able to acquire the TA's before receiving the RAR, and the wireless terminals T11, T12, T21, T22, T31~T34 and mobile terminals MT1, MT2 would not be able to adjust the timing for transmitting the preambles.

Because of this, a collision of preambles may occur at the base station when the preambles transmitted by multiple wireless terminals are detected in the same preamble detection segment. In the existing wireless communication system, if a preamble collision occurs, the base station may either be unable to detect the preamble collision or, if able to detect the preamble collision, may not respond to the corresponding preamble. Thus, the terminal that sent the corresponding preamble would not receive a response to the preamble and would reattempt a random access after backing off for a certain duration of time.

In contrast, in this embodiment, the wireless terminals T11, T12, T21, T22, T31~T34 may make the transmissions by adjusting the transmission timing of the preambles. This is because, in this embodiment, the wireless terminals are IoT terminals having fixed locations. As the wireless terminals are installed in designated locations, the distances to the base station are already determined, and the wave delays are always kept constant. An IoT terminal may be installed at a designated location and may receive the TA from the base station through an initial communication with the base station, after which the received TA can be used for adjusting the timing of the preamble in subsequent transmissions. That is, the IoT terminal may acquire the TA from the base station from an initial random access process and afterwards may use the stored TA to perform the uplink synchronization and adjust the transmission timing of the preamble.

Here, a wireless terminal T11, T12, T21, T22, T31~T34 may adjust the timing of its preamble transmission based on the TA such that the preamble is detected at a particular preamble detection segment from among a multiple number of preamble detection segments, which are time segments at which the base station BS1~BS3 performs preamble detection. That is, the preamble may be transmitted with the transmission timing adjusted such that the preamble is detected at an arbitrary time point within a preamble detection segment.

In particular, in a wireless communication system based on this embodiment, the wireless terminal T11, T12, T21, T22, T31~T34 can transmit the preamble by adjusting the timing of the preamble transmission based on the TA such that the preamble is detected at a detection sub-segment selected in a designated manner from among a multiple number of detection sub-segments included in the preamble detection segment of the base station BS1~BS3. In other words, the wireless terminal can not only transmit the preamble by randomly selecting the preamble but also transmit the preamble by selecting a detection sub-segment, into which the preamble detection segment for the detecting of the preamble by the base station is divided, in a designated manner and making the transmission such that the preamble is detected in the selected detection sub-segment, in order to reduce the occurrence of preamble collisions.

To this end, a base station based on this embodiment can further include information on the detection sub-segments in the SIB2 information when broadcasting the SIB2 information to the wireless terminals. Also, the wireless terminal can select the detection sub-segment by a designated method based on the information on detection sub-segments included in the SIB2 information.

However, the at least one mobile terminals MT1, MT2 may not have fixed TA's, since their distances to the base station may vary. That is, these cannot use TA's that were acquired previously. Therefore, the mobile terminals MT1, MT2 may, in the conventional manner, transmit preambles to the base station regardless of the previously acquired TA's and may perform uplink synchronization with the base station after acquiring the TA's from the RAR messages transmitted from the base station. That is, the mobile terminals MT1, MT2 may perform the random access by transmitting preambles to the base station in the same manner as the related art. Here, the base station may detect the preambles transmitted from the mobile terminals MT1, MT2 according to the preamble detection segment rather than the detection sub-segment. This is because the timing by which the mobile terminals transmit the preambles may vary.

Thus, the detection sub-segments in this embodiment may be divided segments of the preamble detection segment for fixed terminals having fixed locations rather than for mobile terminals MT1, MT2, and a fixed terminal may adjust the preamble transmission timing according to the TA and the detection sub-segment information.

A wireless terminal may have to receive the RAR message within the window of time designated in the SIB2 information and, if a RAR message is not received within the designated window, may stand by for a particular duration of time according to the back-off indicator value and retransmit the random access preamble afterwards with the transmission power increased.

In the conventional wireless communication system that does not divide the preamble detection segment into detection sub-segments, if more than one wireless terminals transmit identical preambles in the same preamble detection segment, the wireless terminals can receive the same RAR message from the base station. In such a case, the TC-RNTI that the wireless terminals receive would be the same, so that the wireless terminals may include an arbitrary number of a pre-designated number of bits (for example, 48 bits) or their unique identification information in the terminal identification messages and transmit the messages through the same PUSCH (physical uplink shared channel).

In the conventional wireless communication system, even if identical preambles are received at the base station from multiple wireless terminals in the same preamble detection segment, the base station that has not detected this would transfer the same RAR message to the multiple wireless terminals. In this case, the multiple terminals would transmit terminal identification messages simultaneously over the same resources, causing a collision at the base station side. As a result, the base station would either be unable to demodulate the messages of all of the wireless terminals or be able to demodulate only the message of the one wireless terminal having the strongest reception power. When demodulation is successful for a terminal, the base station may notify this through a contention resolution message.

However, when demodulation is not successful, the wireless terminals may reattempt a random access after waiting for a duration of time defined by their back-off indicators, so that the average random access delay time of the terminals may be lengthened and the amount of power consumption for the random access may be increased. This can pose a significant problem in an IoT environment, such as for 5G, where wireless terminals connect to the network in a large scale and consequently frequent occurrences of preamble collisions are expected.

In other words, when the base station receives identical preambles from multiple wireless terminals in the same preamble detection segment, if this cannot be detected, another collision may be incurred.

As described above, however, in a wireless communication system based on this embodiment, the preamble detection segments can each be divided into a multiple number of detection sub-segments, and a wireless terminal can select a detection sub-segment from among the multiple number of divided detection sub-segments and can transmit the preamble with the preamble transmission timing adjusted, based on the TA, such that the preamble is received at the base station in the selected detection sub-segment.

This provides an effect that is equal to increasing the number of preambles in a manner corresponding to the number of divided detection sub-segments, compared to the existing random access method of selecting one of a limited number of preambles for transmission. For example, supposing that the number of preambles is designated to 64 and that the preamble detection segments of the base station are each divided into two detection sub-segments, the wireless communication system can provide the same effect of using 128(=64*2) preambles. That is, using the same radio resources, twice or more of the preamble resources can be used. Thus, since it is possible to use 128 or more preambles in one preamble detection cycle of the PRACH, the probability of a preamble collision can be greatly reduced by half or less.

However, as the number of preambles the base station BS1~BS3 has to identify in the preamble detection segment is increased to be multiplied by the number of detection sub-segments compared to the conventional method, the bit number of the preamble identifier, referred to herein as RAPID (random access preamble ID), may have to be increased in correspondence with the number of detection sub-segments. For example, if a conventional base station identified 64 preambles with RAPID's of 6 bits, a base station based on this embodiment that has the preamble detection segment divided into two detection sub-segments can identify the preambles with RAPID's of 7 bits.

In this embodiment, the base station can transmit a RAR message without timing advance command information. In LTE/LTE-A, the timing advance command information is an 11-bit piece of information that includes TA information, which is acquired by calculating the wave delay from a wireless terminal to the base station. As already described above, however, the wireless terminal may have a fixed location so that the TA may not vary, and when transmitting the preamble, the transmission timing of the preamble can be adjusted based on a previously acquired TA.

As such, the base station can transmit the RAR message to the wireless terminal with the timing advance command information excluded, and the wireless terminal can nevertheless transmit the preamble, such that it is detected in a particular detection sub-segment, based on previously acquired TA information.

Upon receiving the RAR message, the wireless terminal may transmit a random access procedure message, such as an RRC connection request, through a terminal identification message (operation S140).

When the terminal identification message is transmitted (operation S140), the base station may demodulate the terminal identification message and transmit a contention resolution message, including the terminal identification information that was included in the demodulated terminal identification message, such that the message can be received through the TC-RNTI (operation S150).

In the event of a collision between multiple wireless terminals, each of the wireless terminals involved may receive the contention resolution message and check the terminal identification information included in the contention resolution message to determine whether or not the contention resolution message transmitted from the base station is a message for itself.

A wireless terminal that has ascertained that the message is for itself may set the TC-RNTI to its own C-RNTI and transmit an acknowledgement signal (ACK) to the base station. A wireless terminal that does not find its identification information in the contention resolution message need not transmit anything to the base station but rather may announce a random access failure and reattempt the random access process.

FIG. 3 to FIG. 6 are diagrams for explaining the concept of preamble division according to an embodiment of the present disclosure.

Figure 3:
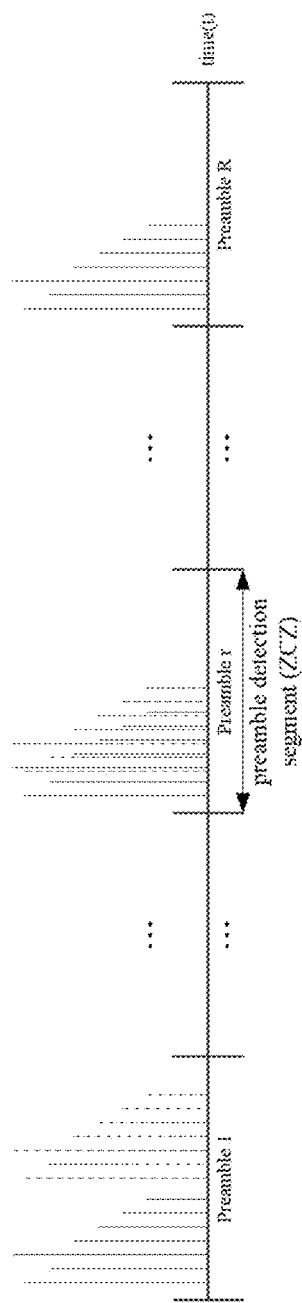
FIG. 3, FIG. 4, FIG. 5, and FIG. 6 are diagrams for explaining the concept of preamble division according to an embodiment of the present disclosure.
Figure 4:
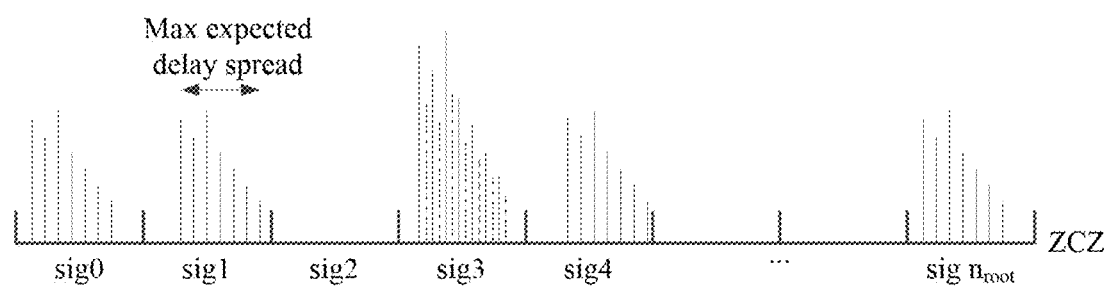
Figure 5:
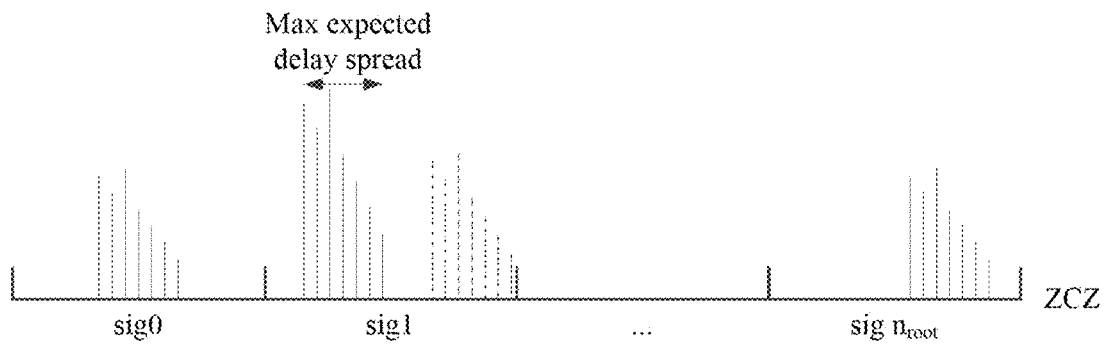
Figure 6:
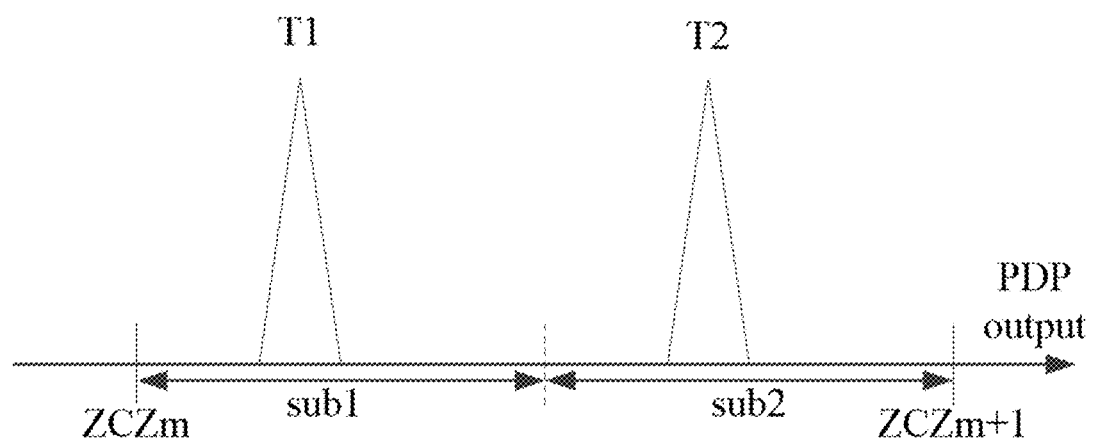

FIG. 3 illustrates a method of preamble detection at the base station, FIG. 4 and FIG. 5 illustrate a method of preamble collision detection at the base station, and FIG. 6 illustrates the concept of preamble division.

While the descriptions here refer to a method of preamble detection according to an embodiment of the present disclosure based on a LTE/LTE-A wireless communication system as an example, the present disclosure is not limited thus.

Generally, in LTE/LTE-A, a Zadoff-Chu sequence subjected to a cyclic shift is used as a preamble. The base station, upon receiving a preamble, may identify the presence of the wireless terminal and may use the preamble to measure the wave delay. As illustrated in FIG. 3, the base station may set preamble detection segments in units of pre-designated time segments and may detect preambles in each of the preamble detection segments. The base station may detect preambles by using a PDP (power delay profile) technique, which is a signal processing technique for finding the wave delay of a preamble. The output from the PDP technique may be represented as a correlation between a pre-designated root Zadoff-Chu sequence and the reception signal, i.e. a signal component corresponding to a delay time of the PDP reception signal. Due to the CAZAC (constant amplitude zero auto-correlation) property of the preambles generated by subjecting the root Zadoff-Chu sequence to a cyclic shift, a ZCZ (zero correlation zone) may be created. That is, the ZCZ may represent each preamble detection segment.

As illustrated in FIG. 3, the base station may detect which point of the preamble detection segment (ZCZ) a preamble signal is located at, and based on this, may measure the wave delay from the wireless terminal to the base station. When the wave delay of the received preamble is determined through the PDP, the base station may use this to calculate the TA, which is a timing adjustment value for the uplink synchronization of the wireless terminal. The wireless terminals receive these TA values included in the RAR messages from the base station and perform uplink synchronization with the base station by adjusting their own transmission timing using the received TA's. In a LTE/LTE-A system, for example, it would be possible for a wireless terminal to adjust the timing in units of 0.52 μs in the 10 MHz band.

When more than one preambles are received in a single preamble detection segment, if they are received such that the multiple peaks overlap as in FIG. 4, the base station may not sense the collision of preambles. Not only that, the base station may be unable to demodulate the preambles.

In contrast, if they are received without having multiple peaks overlapping in a single preamble detection segment as in FIG. 5, the base station can sense the collision of preambles. That is, if the wave delay between multiple wireless terminals differs by a certain level or more, the base station can sense the collision of the preambles from the difference in wave delays of the preambles. Here, the condition in which the base station is able to sense the preamble collision is:

$$R_{max} - R_{max} > \frac{c}{2B},$$

where $R_{max}$ and $R_{min}$ represent distances from the base station to the respective wireless terminals, c represents the speed of light (300000 km/s), and B represents the bandwidth of PRACH.

As described above, in a conventional wireless communication system, the base station would not transmit the RAR message not only when a collision of preambles is not detected but also when the collision of preambles is detected. This is because the base station can identify only one preamble in a single preamble detection segment. Thus, the other wireless terminals that do not receive the RAR message would back off for a pre-designated duration of time and attempt the random access again afterwards.

FIG. 6 illustrates the concept of a preamble division scheme, where the m-th preamble detection segment is divided into two detection sub-segments sub1, sub2 according to this embodiment.

As illustrated in FIG. 6, a preamble detection segment may be divided into a multiple number (FIG. 6 uses an example in which this number is two) of detection sub-segments sub1, sub2, and a wireless terminal may randomly select one detection sub-segment from among the multiple detection sub-segments sub1, sub2 of the divided preamble detection segment and may make the transmission with the preamble transmission timing adjusted based on the TA such that the preamble is received at the base station in the corresponding detection sub-segment.

Suppose a first wireless terminal T1 makes a transmission such that the preamble is received in a first detection sub-segment sub1 from among the two detection sub-segments sub1, sub2 into which the m-th preamble detection segment is divided, and a second wireless terminal T2 makes a transmission such that the preamble is received in a second detection sub-segment sub2. Then, a base station based on this embodiment can identify the preambles received in the detection sub-segments sub1, sub2 separately. That is, the base station may detect the preambles separately in each detection sub-segment, so that even if multiple identical preambles are received in the same preamble detection segment, each preamble can be identified separately. In other words, the preambles of the two wireless terminals may not collide. This can provide an effect analogous to increasing the preambles in a wireless communication system having a limited number of preambles.

While the descriptions here use an example in which the preamble detection segment is divided into two detection sub-segments sub1, sub2 for the sake of convenience, the embodiment is not thus limited. Also, although the descriptions above refer to multiple wireless terminals randomly selecting the detection sub-segments, it is possible in certain cases to have at least one wireless terminal configured to select a designated detection sub-segment from among the multiple number of detection sub-segments.

Figure 7:
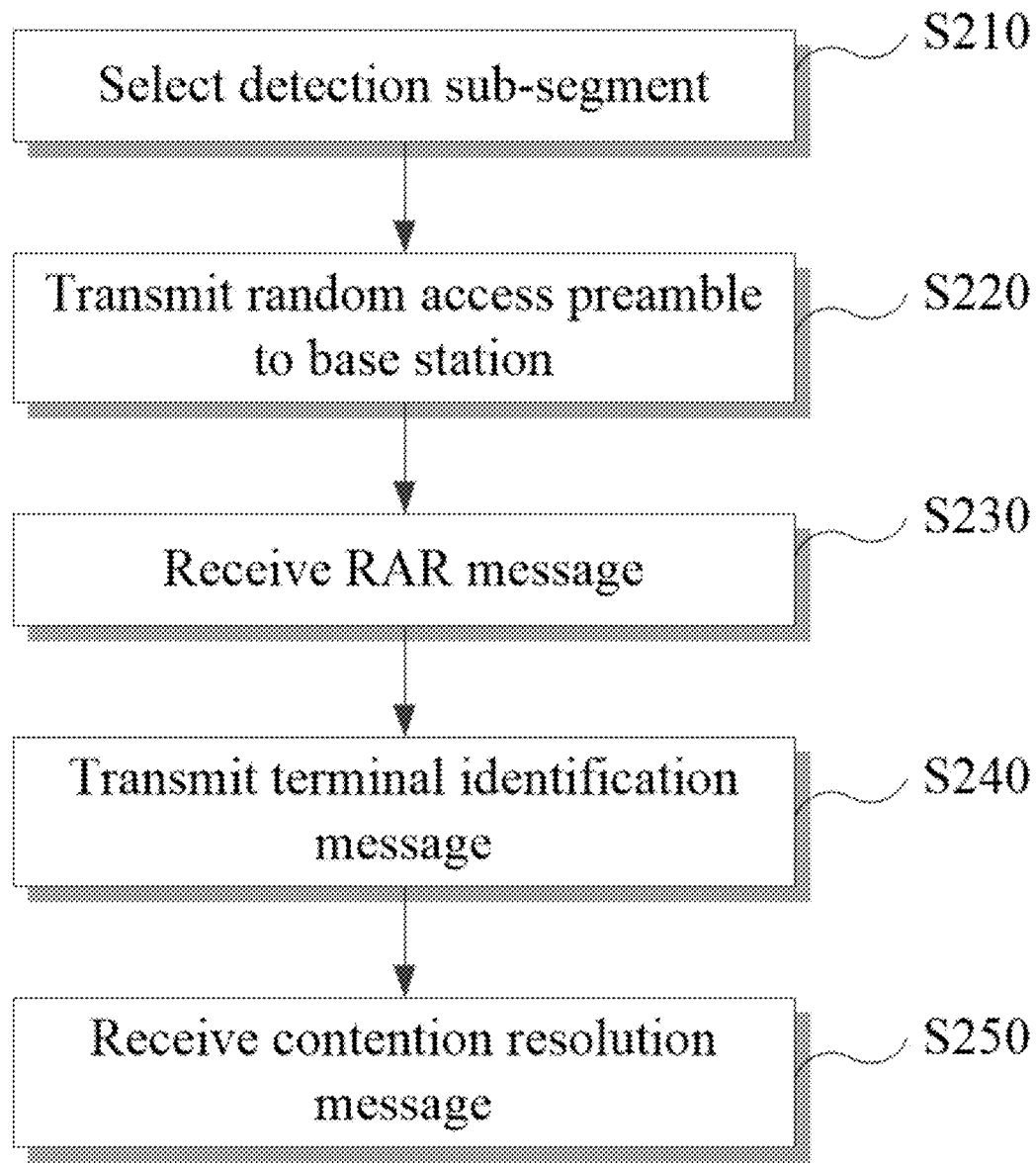
FIG. 7 illustrates a random access method for a wireless terminal in a wireless communication system based on an embodiment of the present disclosure.

FIG. 7 illustrates a random access method for a wireless terminal in a wireless communication system based on an embodiment of the present disclosure.

Describing the operation of a wireless terminal in a wireless communication system based on this embodiment with reference to FIG. 7, first, a wireless terminal that wishes to connect to the network from among the multiple number of wireless terminals T11, T12, T21, T22, T31~T34 may select a detection sub-segment from among a multiple number of detection sub-segments into which a preamble detection segment is divided (operation S210). Here, the wireless terminal can randomly select a detection sub-segment, or if some cases, can select a pre-designated detection sub-segment.

Each wireless terminal can check the information regarding the multiple number of detection sub-segments, into which a preamble detection segment is divided, from SIB2 information received previously from the base station. Also, each wireless terminal can have a previously acquired TA already stored, where the TA can have been acquired by the wireless terminal through a previous communication with the base station (for example, the initial random access process).

The wireless terminal may then make the transmission with the preamble transmission timing adjusted based on the previously acquired TA such that the random access preamble is received at the base station in the detection sub-segment selected from the preamble detection segment (operation S220). Here, the wireless terminal may randomly select a preamble from among the pre-designated number of random access preamble sequences, add a CP (cyclic prefix), and make the transmission to the base station through the PRACH.

The wireless terminal may receive a RAR message from the base station (operation S230), and in response, may transmit to the base station a terminal identification message that includes its unique identification information or an arbitrary number of a pre-designated number of bits (operation S240).

Then, the wireless terminal may receive a contention resolution message from the base station and set the TC-RNTI as its C-RNTI (operation S250).

Figure 8:
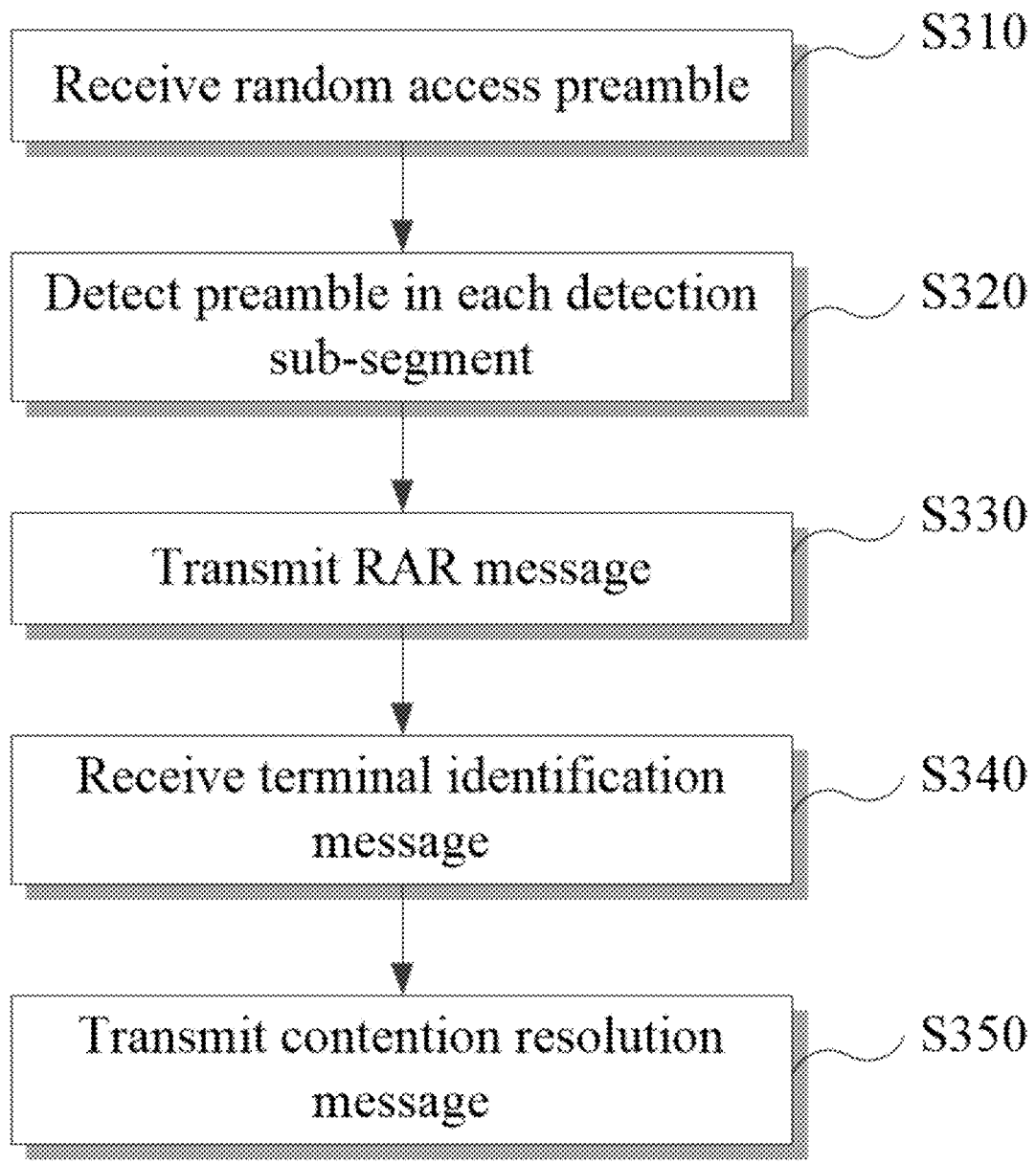
FIG. 8 illustrates a random access method for a base station in a wireless communication system based on an embodiment of the present disclosure.

FIG. 8 illustrates a random access method for a base station in a wireless communication system based on an embodiment of the present disclosure.

Referring to FIG. 8, the base station may receive a random access preamble from at least one wireless terminal (operation S310). Here, the base station can have identical preambles selected by multiple wireless terminals received in the same preamble detection segment.

The base station may detect the received random access preambles in units of pre-designated preamble detection segments. Here, a base station based on this embodiment can detect the preambles with the preamble detection segment divided into a multiple number of detection sub-segments (operation S320).

In the case of a conventional base station, the random access preambles would be detected only in units of the preamble detection segments, so that if identical random access preambles are received in a single preamble detection segment, the base station either would be unable to detect this or, even if it was detected, would not provide any acknowledgement to the wireless terminals.

Compared to this, a base station based on this embodiment can detect the random access preambles in units of detection sub-segments, and therefore if identical random access preambles are received in different detection sub-segments, the base station can readily identify this.

According to the identified random access preamble, the base station may transmit a RAR message to the wireless terminal (operation S330) and may receive a terminal identification message transmitted from the wireless terminal that received the RAR message (operation S340). Here, the RAR message can omit the timing advance command information.

When a terminal identification message is received (operation S340), the base station may demodulate the terminal identification message and may transmit a contention resolution message, which may include the terminal identification information included in the demodulated terminal identification message, to the corresponding wireless terminal (operation S350).

Although it is not shown in the figure, the base station can broadcast SIB2 information to the wireless terminals before operation S310 of receiving the random access preambles, as illustrated in FIG. 2, where the SIB2 information being broadcasted can include information on the detection sub-segments.

The cell area of each of the multiple number of base stations BS1~BS3 in a wireless communication system based on an embodiment of the present disclosure can also include mobile wireless terminals. However, in the case of a mobile wireless terminal, the location may be moved, and the wave delay time may be varied, so that consequently the TA cannot be adjusted arbitrarily. Thus, a mobile wireless terminal can transmit a preamble according to the preamble detection segment in the same manner as in the related art, without dividing into detection sub-segments.

Figure 9:
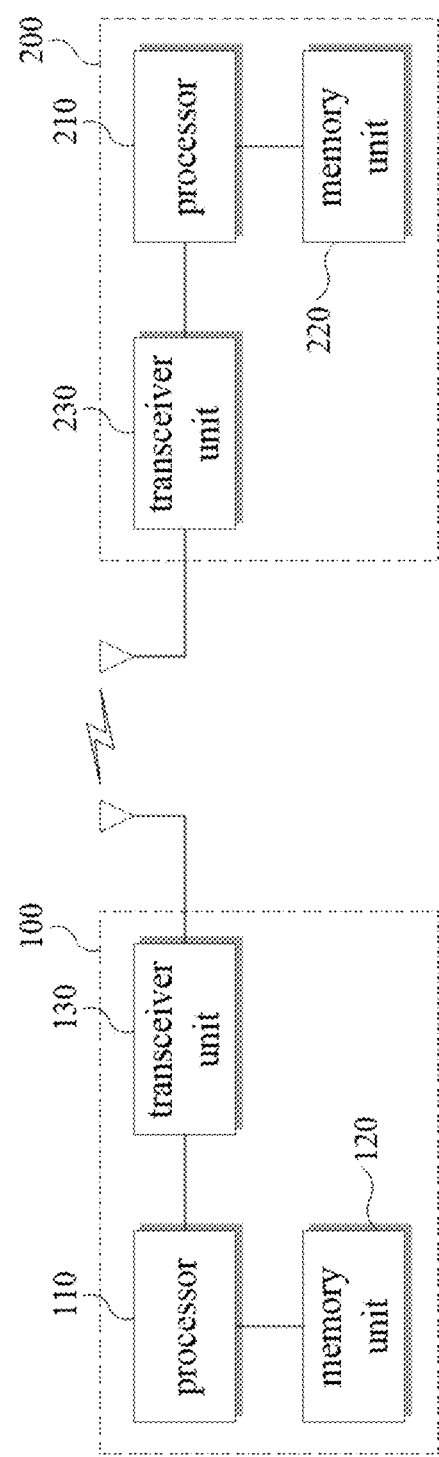
FIG. 9 is a block diagram conceptually illustrating a wireless terminal and a base station based on an embodiment of the present disclosure.

FIG. 9 is a block diagram conceptually illustrating a wireless terminal and a base station based on an embodiment of the present disclosure.

In this embodiment, the wireless terminal 100 and the base station 200 may be devices for performing random access in a wireless communication system, and as illustrated in FIG. 9, the wireless terminal 100 and the base station 200 can each include a processor 110, 210, a memory unit 120, 220, and a transceiver unit 130, 230 to perform the random access.

The processor 210 of the base station 200 may include detection sub-segment information, which was pre-stored in the memory unit 220, in the SIB2 information and may broadcast this via the transceiver unit 230 to the wireless terminals 100 and mobile terminals within the cell.

The memory unit 120 of the wireless terminal 100 may store various information, including the preamble sequence acquired from the SIB2 information that was broadcasted from the base station. In particular, the memory unit 120 of a wireless terminal 100 based on this embodiment may store the TA transmitted and acquired previously from the base station as well as information regarding the detection sub-segments into which the preamble detection segment is divided.

The processor 110 may analyze the detection sub-segment information stored in the memory unit 120 to select the detection sub-segment in which the preamble is to be received at the base station and may calculate the timing for transmitting the preamble based on the TA such that the preamble arrives at the base station in the selected detection sub-segment. The preamble may be transmitted via the transceiver unit 130 to the base station 200 at the calculated timing.

The processor 210 of the base station 200 may divide the preamble detection segment in units of multiple detection sub-segments and may detect preambles received via the transceiver unit 230 in each of the multiple detection sub-segments. The processor 210 may identify a preamble detected in each unit of detection sub-segment and transmit a RAR message, including pre-designated information, via the transceiver unit 230 to the wireless terminal that transmitted the preamble. Here, some of the information that is to be included in the RAR message can be stored beforehand in the memory unit 220. However, in the RAR message based on this embodiment, the timing advance command information can be omitted.

When a RAR message is received from the base station, the processor 110 of the wireless terminal 100 may include an arbitrary number of a pre-designated number of bits or its unique identification information pre-stored in the memory unit 120 in a terminal identification message and transmit the message via the transceiver unit 130 to the base station. Then, the processor 210 of the base station 200 may demodulate the terminal identification message, include the terminal identification information included in the demodulated terminal identification message in a contention resolution message, and transmit the contention resolution message, after which the processor 110 of the wireless terminal 100 may receive the contention resolution message, set the TC-RNTI as its C-RNTI, and perform the random access.

A method based on an embodiment of the present disclosure can be implemented in the form of a computer program stored in a medium for executing on a computer. Here, the computer-readable medium can be an arbitrary usable medium that can be accessed by a computer and can include all types of computer storage media. The computer storage media encompasses computer-readable instructions, data structures, program modules, or other volatile and non-volatile, detachable and non-detachable media implemented by an arbitrary method or technology for storing information such as data, and can include ROM (read-only memory), RAM (random access memory), CD-ROM, DVD-ROM, magnetic tapes, floppy disks, optical data storage devices, etc.

While the present disclosure is described with reference to the embodiment illustrated in the drawings, this is provided merely as an example, and a person having ordinary skill in the art would appreciate that different variations and equivalent embodiments can be derived.

As such, the true scope of protection for the present disclosure is to be defined by the technical spirit of the appended claims.

What is claimed is:

1. A wireless terminal in a wireless communication system having a base station and wireless terminals performing random access, wherein the wireless terminal comprising:
   a processor;
   memory storing instructions, when executed by the processor, that cause the wireless terminal to:
   store a TA (timing advance) acquired during a previous communication with the base station,
   select a detection sub-segment from a preamble detection segment, wherein the preamble detection segment is divided into a plurality of detection sub-segments,
   transmit a random access preamble by adjusting a timing such that the random access preamble is received at a base station in the selected detection sub-segment according to the stored TA,
   before selecting the detection sub-segment, receive SIB2 (system information block 2) information, the SIB2 information pertaining to system information related to a random access and being broadcasted from the base station, and determine the preamble detection segment and the plurality of detection sub-segments of the base station according to detection sub-segment information included in the SIB2 information, and
   when a random access response message is received from the base station, transmit a terminal identification message to the base station and receive a contention resolution message from the base station,
   wherein the wireless terminal is a fixed IoT (Internet of Things) terminal,
   wherein the random access preamble is detected separately in each detection sub-segment by the based station, and
   wherein the detecting of the random access preamble comprises:
   assigning different preamble identifiers (RAPID's) for identical random access preambles detected in different detection sub-segments of one preamble detection segment.

2. A base station in a wireless communication system having a base station and wireless terminals performing random access, wherein the base station comprising:
   a processor;
   memory storing instructions, when executed by the processor, that cause the wireless terminal to:
   divide a preamble detection segment into a plurality of detection sub-segments designated beforehand and detect a random access preamble received from at least one wireless terminal in units of the divided detection sub-segments, wherein the base station detects the random access preamble separately in each detection sub-segment,
   transmit a random access response message to the wireless terminal according to the detected random access preamble, when a terminal identification message is received from the wireless terminal, transmit a contention resolution message to the wireless terminal, assign different preamble identifiers (RAPID's) for identical random access preambles detected in different detection sub-segments of one preamble detection segment, and before receiving the random access preamble, broadcast SIB2 (system information block 2) information, the SIB2 information pertaining to system information related to a random access and including detection sub-segment information pertaining to information on the plurality of detection sub-segments, wherein, the wireless terminal has a TA (timing advance) stored beforehand, the TA being acquired during a previous communication with the base station, and transmits the random access preamble by adjusting the timing such that the random access preamble is received at the base station in the selected detection sub-segment according to the stored TA, wherein the wireless terminal is a fixed IoT (Internet of Things) terminal.

3. A random access method for a wireless terminal in a wireless communication system, the random access method comprising:

storing a TA (timing advance) acquired during a previous communication with a base station, selecting a detection sub-segment from a preamble detection segment, the preamble detection segment being divided into a plurality of detection sub-segments;

transmitting a random access preamble by adjusting a timing such that the random access preamble is received at a base station in the selected detection sub-segment according to the stored TA;

receiving a random access response message from the base station;

transmitting a terminal identification message to the base station;

receiving a contention resolution message from the base station; and before the selecting of the detection sub-segment;

receiving SIB2 (system information block 2) information, the SIB2 information pertaining to system information related to a random access and broadcasted from the base station; and dividing the preamble detection segment into the plurality of detection sub-segments of the base station according to detection sub-segment information included in the SIB2 information wherein the wireless terminal is a fixed IoT (Internet of Things) terminal, and wherein the detecting of the random access preamble comprises:

assigning different preamble identifiers (RAPID's) for identical random access preambles detected in different detection sub-segments of one preamble detection segment.

4. A random access method for a base station in a wireless communication system, the random access method comprising:

receiving a random access preamble from at least one wireless terminal;

detecting the random access preamble in units of a plurality of detection sub-segments of a preamble detection segment;

transmitting a random access response message to the wireless terminal according to the detected random access preamble;

receiving a terminal identification message from the wireless terminal; and transmitting a contention resolution message to the wireless terminal, wherein the detecting of the random access preamble comprises:

dividing a single preamble detection segment into the plurality of detection sub-segments;

detecting the random access preamble separately in each unit of the plurality of detection sub-segments, and before the receiving of the random access preamble:

broadcasting SIB2 (system information block 2) information, the SIB2 information pertaining to system information related to a random access and including detection sub-segment information pertaining to information on the plurality of detection sub-segments, wherein the wireless terminal has a TA (timing advance) stored beforehand, the TA being acquired during a previous communication with the base station, and transmits the random access preamble by adjusting the timing such that the random access preamble is received at the base station in the selected detection sub-segment according to the stored TA, wherein the wireless terminal is a fixed IoT (Internet of Things) terminal, and wherein the detecting of the random access preamble comprises:

assigning different preamble identifiers (RAPID's) for identical random access preambles detected in different detection sub-segments of one preamble detection segment.

* * * * *